(12) United States Patent
Laconte

(10) Patent No.: US 7,905,071 B2
(45) Date of Patent: Mar. 15, 2011

(54) USE OF A WINDOW GLASS COMPRISING A PROFILED BEAD FOR INSTALLING IT IN AN OPENING

(75) Inventor: Jean-Gerard Laconte, Courbevoie (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 11/373,114

(22) Filed: Mar. 13, 2006

(65) Prior Publication Data

US 2006/0162274 A1    Jul. 27, 2006

Related U.S. Application Data

(63) Continuation of application No. 10/410,271, filed on Apr. 10, 2003, now Pat. No. 7,040,063, which is a continuation of application No. PCT/FR00/02818, filed on Oct. 10, 2000.

(51) Int. Cl.
*E04C 2/38* (2006.01)
(52) U.S. Cl. ............... 52/717.01; 52/204.69; 52/208; 52/716.5; 296/84.1; 296/146.15; 428/122
(58) Field of Classification Search .......... 52/208, 52/204.53, 204.69, 716.8, 204.5, 204.369, 52/204.62, 716.1, 716.2, 716.5, 717.01, 717.03–717.05; 296/84.1, 96.21, 146.15; 428/122
See application file for complete search history.

(56) References Cited

U.S. PATENT DOCUMENTS

| 3,779,794 A | 12/1973 | De Santis et al. |
| 4,571,278 A | 2/1986 | Kunert |
| 4,581,276 A | 4/1986 | Kunert et al. |
| 4,876,132 A | 10/1989 | Kunert |
| 4,878,850 A | 11/1989 | Letemps et al. |
| 4,897,853 A | 1/1990 | Argent |
| 4,910,071 A | 3/1990 | Kunert |
| 4,933,032 A * | 6/1990 | Kunert .................. 156/108 |
| 5,057,265 A * | 10/1991 | Kunert et al. .......... 264/511 |
| 5,062,248 A | 11/1991 | Kunert |

(Continued)

FOREIGN PATENT DOCUMENTS

DE    31 18 124    4/1982

(Continued)

OTHER PUBLICATIONS

Translation of Notice of Rejection (Official Action in Corresponding Application No. JP 2002-534099, Date: Apr. 27, 2010, Mailing Date: May 11, 2010.

(Continued)

*Primary Examiner* — Brian E Glessner
*Assistant Examiner* — William V Gilbert
(74) *Attorney, Agent, or Firm* — Oblon, Spivak, McClelland, Maier & Neustadt, L.L.P.

(57) ABSTRACT

A window glass, particularly for installation by adhesive bonding in an opening of a vehicle bodywork, comprises a sheet of glass with a profiled bead that is fixed at least to the main surface of the sheet of glass facing toward the interior in the installed state and that rests against at least part of the opening. The use of such a window glass makes it possible, once the window glass has been installed in the bodywork opening, to obtain a visible space less than 5 mm between the opening and the edge face of the window glass.

20 Claims, 3 Drawing Sheets

U.S. PATENT DOCUMENTS

| | | | |
|---|---|---|---|
| 5,095,669 A | 3/1992 | Kunert et al. | |
| 5,137,770 A | 8/1992 | Rothe et al. | |
| 5,154,028 A | 10/1992 | Hill et al. | |
| 5,273,704 A | 12/1993 | Scholl et al. | |
| 5,316,829 A | 5/1994 | Cordes et al. | |
| 5,336,349 A | 8/1994 | Cornils et al. | |
| 5,384,995 A * | 1/1995 | Kunert et al. | 52/394 |
| 5,391,416 A * | 2/1995 | Kunert | 428/122 |
| 5,519,979 A * | 5/1996 | Kunert et al. | 52/745.15 |
| 5,614,051 A | 3/1997 | Fisher et al. | |
| 5,620,794 A * | 4/1997 | Burkart et al. | 428/343 |
| 5,711,119 A | 1/1998 | Cornils et al. | |
| 5,723,196 A | 3/1998 | Cornils et al. | |
| 5,806,257 A | 9/1998 | Cornils et al. | |
| 5,864,996 A * | 2/1999 | Veldman et al. | 52/204.597 |
| 5,897,937 A | 4/1999 | Cornils et al. | |
| 5,935,356 A | 8/1999 | Soldner | |
| 5,988,730 A | 11/1999 | Bekaert | |
| 6,238,769 B1 * | 5/2001 | Nishio et al. | 428/120 |
| 6,287,402 B2 * | 9/2001 | Soldner | 156/71 |
| 6,347,491 B1 | 2/2002 | Legrand | |
| 6,487,823 B2 * | 12/2002 | Lagrue | 52/208 |
| 7,040,063 B2 * | 5/2006 | Leconte | 52/204.62 |

FOREIGN PATENT DOCUMENTS

| | | |
|---|---|---|
| DE | 35 36 806 | 4/1987 |
| DE | 35 45 899 | 4/1987 |
| DE | 38 18 930 | 12/1989 |
| DE | 40 26 205 | 2/1992 |
| DE | 43 26 179 | 2/1994 |
| DE | 43 01 026 | 7/1994 |
| EP | 0 024 501 | 3/1981 |
| EP | 0 083 797 | 7/1983 |
| EP | 0 121 480 | 10/1984 |
| EP | 0 121 481 | 10/1984 |
| EP | 0 153 456 | 9/1985 |
| EP | 0 157 281 | 10/1985 |
| EP | 0 238 890 | 9/1987 |
| EP | 0 298 788 | 1/1989 |
| EP | 0 307 317 | 3/1989 |
| EP | 0 371 810 | 6/1990 |
| EP | 0 421 833 | 4/1991 |
| FR | 2 716 416 | 8/1995 |
| JP | 64-030831 | 2/1989 |
| JP | 01-153325 | 6/1989 |
| JP | 02-106427 | 4/1990 |
| JP | 02-171314 | 7/1990 |
| JP | 03-153414 | 7/1991 |
| JP | 03-193643 | 8/1991 |
| JP | 06-320944 | 11/1994 |
| JP | 10-324155 | 12/1998 |
| JP | 2000-25665 | 1/2000 |
| JP | 2002-526316 | 8/2002 |
| WO | 98/18642 | 5/1998 |
| WO | 00/17002 | 3/2000 |

OTHER PUBLICATIONS

Notice of Opposition to a European Patent dated Jun. 3, 2008, Patent No. EP 1 324 892 B1, Application No. 00968000.0, Grant Date: Sep. 5, 2007.

Notice of Opposition to a European Patent dated Jun. 4, 2008, Patent No. EP 1 324 892 B1, Application No. 00968000.0, Grant Date: Sep. 5, 2007.

* cited by examiner

USE OF A WINDOW GLASS COMPRISING A PROFILED BEAD FOR INSTALLING IT IN AN OPENING

CROSS-REFERENCE TO RELATED APPLICATIONS

This application is a continuation application of U.S. application Ser. No. 10/410,271, filed Apr. 10, 2003, now U.S. Pat. No. 7,040,063, issued May 9, 2006; which is a continuation of the U.S. National Stage designation of co-pending International Patent Application PCT/FR00/02818, filed Oct. 10, 2000, the entire contents of which are expressly incorporated herein by reference thereto.

FIELD OF THE INVENTION

The invention relates to the field of window glass, particularly for motor vehicles, and is aimed more specifically at window glasses equipped with decorative and/or functional elements attached to the glass. More particularly, the invention relates to a window glass, particularly for installation in an opening in vehicle bodywork, comprising a sheet of glass with a profiled bead that is fixed at least to the main surface of the sheet of glass facing toward the interior in the installed state. This bead may, by way of covering appendage, comprise a lip projecting beyond the edge of the window glass with a sealing rib which can be applied against an adjacent wall part when the window glass is being installed.

BACKGROUND OF THE INVENTION

It is a generally known practice for vehicle window glass to be bonded into the respective openings in the vehicle bodywork. To this end, window glasses are often provided with a profiled bead that adheres at least to the main surface of the glass facing toward the interior, in the installed state. A run of adhesive is applied to the profiled bead and/or near to the profiled bead on this same main surface of the glass. The window glass provided with the run of adhesive is then inserted into the opening in the vehicle bodywork. The latter is surrounded by a mounting flange, to which the run of adhesive is applied. Window glasses in the installed state preferably lie practically flush with the external surface of the bodywork. For such installation, the mounting flange is recessed with respect to the main surface of the bodywork by means of a peripheral angled step. The height of the angled step corresponds to the thickness of the window glass and of the adhesive. In certain embodiments, the edge faces of the window glass are not covered by the profiled bead. As the dimensions of the window glass and the periphery of the opening cannot be matched to one another without tolerance, due to of dimensional variations in manufacture, a space remains, in the form of a groove, between the angled step or the edge of the opening and the window glass.

According to document DE-A1-38 18 930, there is provided, for covering this space, a lip formed directly on the profiled bead bonded to the window, for example by extrusion. In another alternative embodiment from the same document, an additional profiled strip made of a flexible elastomeric plastic is bonded along the peripheral surface of the window on the main surface that faces toward the interior. This profiled strip has a tubular portion, which fills said space when the window glass is in the mounted state.

A shape of profile is also known (from DE-A1-43 01 026), which on three sides surrounds the external edge and the edge face of the window in one embodiment, that is to say also on the external main surface, and which further comprises a lip projecting from the window glass and serving to cover the lateral slot.

Thermoplastics, preferably thermoplastic elastomers (TPE) or thermoplastic olefins (TPO) have mainly been used hitherto as materials for such profiles. With these materials, the lip can be manufactured so that it is already thin enough at the extrusion stage, so that it can be flexed elastically against the edge of the opening when the window glass is installed in the bodywork without generating excessively high reactive forces during the mounting. In addition to its sealing function, the lip centers the window glass in the opening during insertion and keeps the window glass centered.

Dirt can still build up in the space thus covered by the folded-over lip disclosed in the prior art, and can be removed from the bottom of the groove only with difficulty. The space that remains in general actually is greater than 7 millimeters and thus allows a great deal of dirt to accumulate.

The present invention relates to a new type of mounting for a window glass comprising a profiled bead that avoids the aforementioned drawbacks and does not require a finishing strip to cover part of the window glass.

SUMMARY OF THE INVENTION

The invention relates to a window glass that is designed in particular to be installed by adhesive bonding in an opening of a motor vehicle bodywork, comprising a sheet of glass with a profiled bead that is fixed at least to the main surface of the sheet of glass facing toward the interior in the installed state and that rests against at least half of the opening. After installation, the visible space between the opening and the edge face of the window glass is less than 5 millimeters and preferably less than 3 millimeters.

The "edge face of the window glass" is to be understood as meaning either the edge face of the window itself or, if the profiled bead covers it, the corresponding portion of the bead. The profiled bead according to the invention may be a continuous or discontinuous element and may be a single or multiple element, that is to say may consist of at least two practically parallel parts deposited at the periphery of the sheet of glass.

The invention thus makes it possible to obtain closure flush with the main surface of the window and with the adjacent wall or bodywork surface. In addition to the technical advantages afforded, this then visually yields a practically closed surface. The technical advantages are essentially the fact that the visible space between the bodywork opening and the window glass is reduced and that the risk of said region becoming soiled is avoided.

The invention results fro a choice by the inventors not to follow the typical design precautions; instead, the inventors chose to reduce the space between the window glass and the opening by demonstrating, contrary to that which might be expected by a person skilled in the art, that the technique according to the invention was acceptable and did not run the risk of damaging the window glass.

According to an advantageous embodiment of the invention, the profile is designed to limit the expansion of a bead of adhesive, and in particular the lateral expansion thereof. The shape of the profiled bead thus advantageously is designed to prevent the adhesive used to fix the window glass into the bodywork opening from excessively spreading and disrupting the field of view of the window glass. This shape also advantageously makes it possible to define the spacing between the window glass and the bottom of the bodywork opening and therefore allow predetermined positioning in at least one direction. The shape of the bead thus defined also makes it possible to predetermine the amount of adhesive needed to fix the window glass and thus permit the window glass to be firmly secured while making it easier for operations to be automated.

According to a first embodiment of the invention, a bead of adhesive at least partially covers the profiled bead. In particular, depending on the nature of the profiled bead and on the nature of the bead of adhesive, the securing of the window glass is reinforced by the binding of said two beads. The bead of adhesive may be wholly deposited on the profiled bead and their binding thus may be directly associated with the securing of the window glass. Advantageously, in order to bind the two beads, the forces of bonding and the forces of mechanical attachment may be combined. To this end, the profiled bead preferably is provided with anchoring projections. These projections accommodate the bead of adhesive which, after curing, is mechanically held. Advantageously, the invention also relates to an alternate embodiment in which no adhesion occurs between the two beads; such an embodiment may facilitate removal of the window glass, if necessary. Indeed, if the mechanical binding between the two beads is of the nesting type, the window glass may be readily removed.

In other cases, where the bead of adhesive at least partially covers the profiled bead and, in particular, when the sheet of glass comprises at least two sides which have curvatures with small radii of curvature, the profiled bead is produced with a slope such that its surface is inclined downward from its edge oriented toward the center of the window glass toward its other edge positioned at the edge of the sheet of glass. Such an embodiment applies more particularly to windshields or back lights, the lateral approach angles of which are small. In this embodiment, the bead of adhesive subsequently may be deposited by robot with ease; the slope of the profiled bead with respect to the plane of the window glass in this region allows the plane of depositing of the bead of adhesive to be straightened up in the direction of the horizontal when the window glass is resting on its center of the convex side.

According to another alternate embodiment of the invention, the bead of adhesive does not in any way cover the profiled bead. The only contact between the two beads is possibly related to the fact that the profiled bead may be designed to limit the lateral expansion of the bead of adhesive.

According to a preferred embodiment of the invention, the profiled bead has, over at least part of its length, a lip that projects beyond the edge of the window glass. Such a lip advantageously is made to be deformable or flexible. These features give the lip mechanical properties that allow said lip to perform various functions. First, when the lip is over all or part of at least two sides of the window glass, it will act as a centering tool for positioning the window glass correctly in the bodywork opening. Also, for example, when a lip is provided on the upper part of the window glass along all or part of the length of the profile and when the bottom of the window glass rests on stops, said lip may supply a reactive force against the bodywork opening facing it, thus providing a defined space between the bodywork opening and the window glass. Furthermore, the lip avoids any risk of contact between the sheet of glass and the bodywork and therefore any risk of damaging the sheet of glass.

The lip thus produced also may have a sealing function between the opening and the window glass; the lip will bend in one direction or the other, as chosen, and will press against the opening. The pressure thus exerted is enough to provide a good seal. For this function, the lip advantageously is provided along at least three sides of the window glass; it is not actually essential for the lip to be present on the bottom part of the window glass when the latter is installed.

According to an advantageous embodiment of the invention, provision is made for a solid wire to be incorporated into the bead of adhesive or into the profiled bead. The purpose of such a wire is to make it easier to remove the window glass, if necessary, and in particular, to allow materials to be recycled.

Such a bead is inserted for example into or under the bead of adhesive when the latter is produced, taking care to let at least one end of the wire protrude. It thus may be possible when the window glass is in place to grasp hold of this end, possibly using a tool, and then, by pulling on the wire possibly also using a tool, to break the bead of adhesive.

Such a device making it possible to break the bead of adhesive or the profiled bead is practically essential in the context of the invention if the window glass is to be removed. The space visible between the window glass and the bodywork opening, which space is smaller than 5 millimeters, does not permit access by a cutting tool and, in any case, would not allow such a tool to be operated. Indeed, only the case mentioned previously whereby the binding between the window glass and the bodywork is of purely mechanical nature when the profiled bead has anchoring projections permits the window glass to be removed without providing a device such as a cutting wire. However, the present invention also contemplates the combination of such a wire with this mounting exhibiting only mechanical retaining means; in such a case, the wire is no longer truly a cutting wire but provides assistance with disengaging the bead of adhesive and the profiled bead.

According to another advantageous embodiment of the invention, at least two wires are incorporated into the bead of adhesive or the profiled bead. The wires are preferably positioned some distance from one another so that each wire need only slit through part of the bead of adhesive. The forces needed for this operation are therefore reduced.

Means in particular for fitting such wires are, for example, described in patent applications EP-A-0 121 480 and EP-A-0 298 788.

Still according to this same principle of incorporating an element into the bead of adhesive or into the profiled bead, or alternatively at least incorporating an element between the profiled bead and the bead of adhesive, the invention advantageously relates to fitting a sheath into which another element can then be inserted. This may then be a cutting wire or alternatively another type of element having a different function.

In one advantageous embodiment of the invention, a profiled bead is made of a two-part material. For example, the profiled bead may be formed of a polyurethane. The choice of such a material has the advantage of providing excellent compatibility with the intended adhesive, it easily being possible for this adhesive to be chosen from a similar kind.

In another embodiment of the invention, the profiled bead is produced from a thermoplastic. Such material in particular has the advantage of being easy to recycle, which is often a requirement. As regards the compatibility of a thermoplastic with the adhesive, such compatibility is not always easy to obtain. When necessary, particularly when the bead of adhesive at least partially covers a profiled bead made of a thermoplastic, the surface of the latter advantageously may be coated beforehand with an adhesion primer.

In both instances, the means of producing the profiled bead are varied.

According one embodiment, the invention advantageously provides a profiled bead directly obtained by extrusion onto the surface of the sheet of glass. Advantageously in the case of a profile made of a thermoplastic, the extrusion device and, in particular, the extrusion head and piping may be heated.

Alternatively, the profiled bead and the bead of adhesive may be co-extruded directly onto the sheet of glass. The bead of adhesive may remain plastically deformable and adhesive until the window glass is fitted into the bodywork opening.

According to another embodiment of the invention, the profiled bead is manufactured beforehand, for example by extrusion, and later fixed to the sheet of glass, for example by adhesive bonding. Such a profile, for example, is made by extrusion in a long length and then cut to the required length for a given window glass and fixed thereto. To fix the profiled bead, it is possible to adhesively bond it, for example by providing a perforated profile with the adhesive being able to pass through the holes, come into contact with the sheet of glass, and thus secure the profile firmly.

According to another embodiment of the invention, the profile is obtained using an encapsulation technique.

According to any of these techniques of obtaining the profiled bead, said profiled bead is produced on the internal face of the window glass, when the latter is fixed into the bodywork opening. However, the profiled bead may still cover part of the edge face of the glass window and/or cover part of the external face of the window glass.

The profiled bead and/or the bead of adhesive may be in direct contact with the glass or in contact with an opaque layer, such as an enameled coating, itself deposited onto the glass.

As regards the window glass, this consists of at least one sheet of glass and may therefore consist of a laminated window glass.

The invention also provides a window glass consisting in particular of a sheet of glass comprising a profiled bead and in particular intended to be fixed by adhesive bonding into a bodywork opening and which, in particular, can allow use as described previously and for example be fixed in such a way that the space visible after mounting between the window glass and the bodywork opening is less than 5 millimeters.

Other advantageous details and features of the invention will be become apparent hereinafter from the exemplary embodiments of the invention with reference to FIGS. 1 to 3.

BRIEF DESCRIPTION OF THE DRAWINGS

Preferred features of the present invention are disclosed in the accompanying drawings, wherein similar reference characters denote similar elements throughout the several views, and wherein.

DETAILED DESCRIPTION OF PREFERRED EMBODIMENTS

Figure 1:
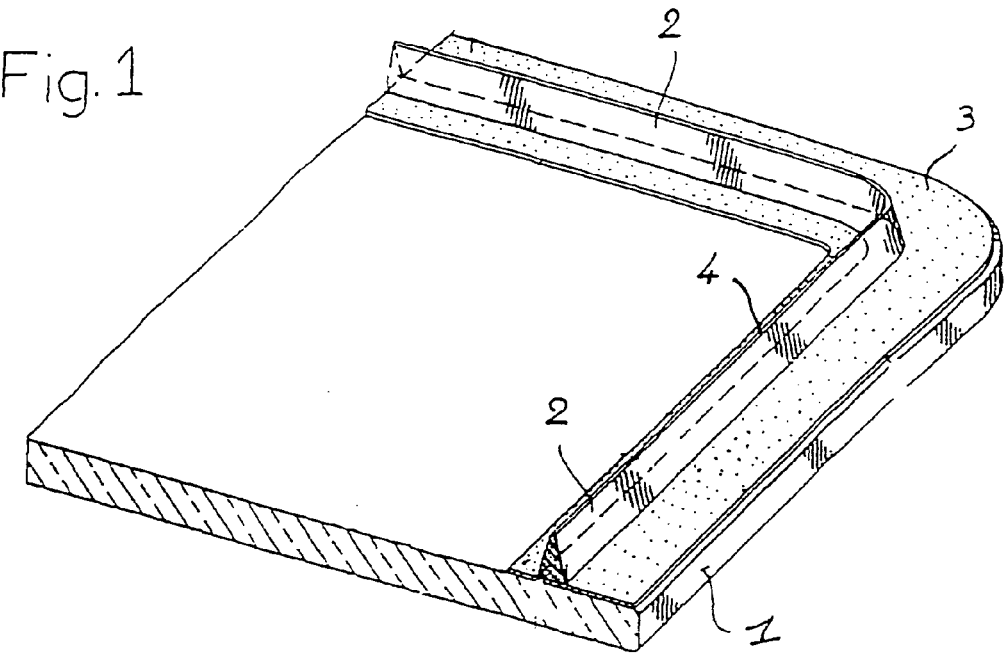
FIG. 1 shows a partial cross-sectional perspective view of a first embodiment of the invention.

FIG. 1 depicts a window glass consisting of a sheet of glass 1 provided with a profiled bead 2 adhering near its edge to one of its main surfaces, which will be the interior surface once the window glass has been installed in a bodywork opening.

The profiled bead 2 can be deposited directly onto the surface of the sheet of glass 1 or, as illustrated here, onto a coating 3, such as an enameled layer deposited by screen printing. The profiled bead 2 is deposited preferably by extrusion or by some other method such as overmolding or encapsulation, adhesive bonding of a prefabricated bead, etc. It is made of a thermoplastic, preferably an elastomer or a blend of thermoplastic elastomers (TPE) or thermoplastic olefin(s) (TPO(s)). It may also be a two-part material such as a polyurethane.

The sheet of glass 1 may consist of glass or a transparent plastic and may be produced monolithically or, unlike the illustration, with a laminated structure combining at least two sheets of glass and/or transparent plastic.

Profiled bead 2 essentially comprises a base profile resting on a main surface of the sheet of glass. This profile projects practically at right angles from the surface of the sheet of glass 1 and, at its free end, forms a bearing rib 4. The latter, in the installed position, is disposed against a mounting flange of a bodywork opening and will, upon mounting, define the position of the window glass in the bodywork opening in terms of the depth to which it is set in said opening.

In the embodiment depicted, profiled bead 2 adheres only to the main surface of the sheet of glass 1 intended to face toward the interior. As an alternative, profiled bead 2 may cover two or three faces of the sheet of glass, namely a main surface and at least part of the edge face of said sheet of glass or, respectively, the two main surfaces and the edge face of the sheet of glass, straddling the edge of the latter.

Figure 2A:
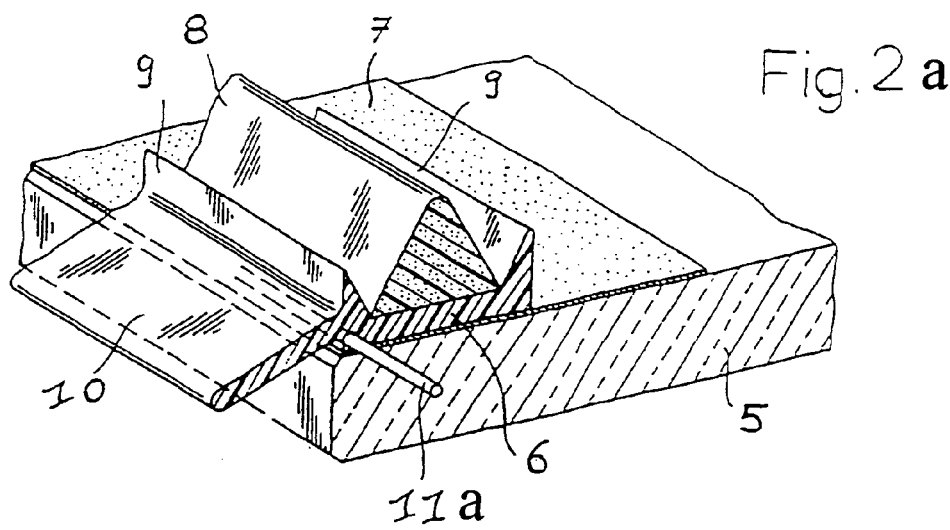
FIG. 2 shows a partial cross-sectional perspective view of a second embodiment of the invention.
Figure 2B:
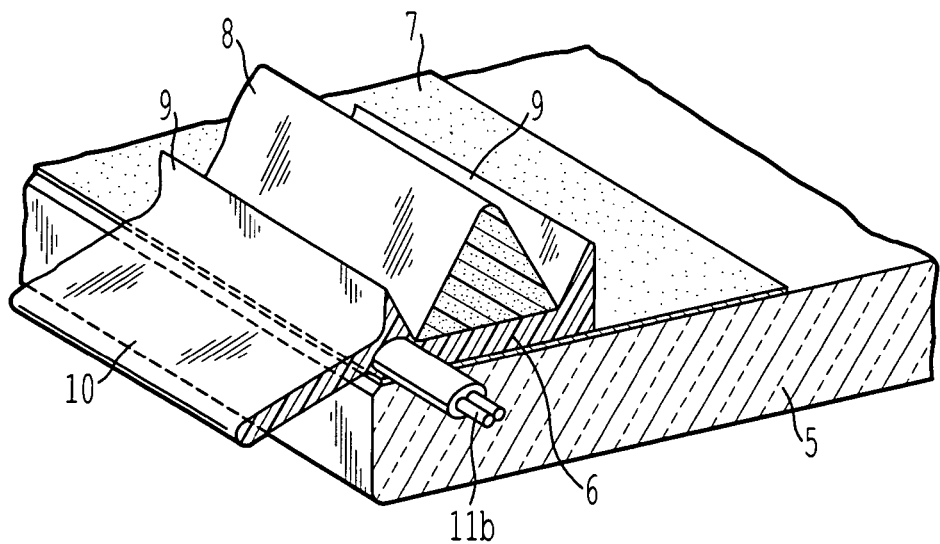
Figure 2C:
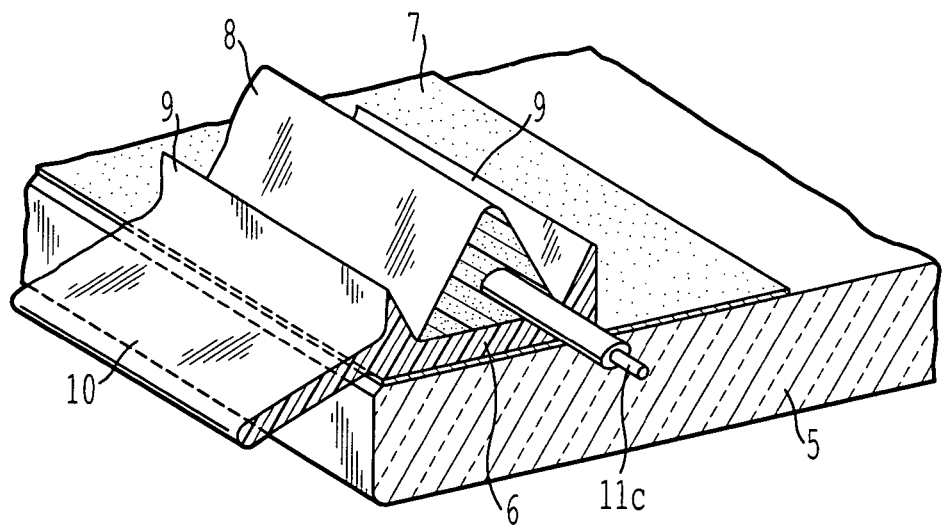

FIG. 2 illustrates another type of window glass consisting, as before, of a sheet of glass 5 but, as already stated, could be a sheet of plastic or a laminated window glass. A profiled bead 6 produced according to one of the previously mentioned methods and materials is fixed to the sheet of glass 5 or, more precisely, to an opaque layer 7, itself deposited on at the periphery of the sheet of glass 5.

FIG. 2 also depicts a bead of adhesive 8 deposited on profile 6. This bead of adhesive 8, in some embodiments, may be deposited directly on the sheet of glass 5 or the opaque layer 7, or alternatively may partially cover profiled bead 6. The bead of adhesive 8 is deposited between two bearing ribs 9 which will limit the expansion of the adhesive on each side, and define the distance separating the bottom of the bodywork opening from the window glass.

The profiled bead 6 additionally comprises a lip 10 projecting beyond the edge of the window glass.

The lip 10, formed of one piece, projects from base profile 6 at a certain angle with respect to the main extension of the latter, possibly practically parallel to the main surface of the sheet of glass, more or less mid-way between the sheet of glass 5 and the bearing ribs 9, and extends beyond the periphery of the sheet of glass 5.

In this configuration, lip 10 may have different functions. Lip 10 advantageously forms an elastically deformable part of profiled bead 6. The lip 10 can thus be deformed upon installation in the bodywork opening and act as a centering element. Of course, lip 10 also has a function of protecting the sheet of glass 5 because it prevents any aggressive contact between said sheet of glass and the metal parts of the bodywork opening. Furthermore, lip 10 also may have a sealing function because it is applied under great pressure against the bodywork opening; its deformation, at the very least, may make it possible to form channels for discharging rain or washing water. The functions of this lip will be further discussed in connection with the description of FIG. 3.

Referring again to FIG. 2, a cutting wire 11 is shown to be incorporated into profile 6. Such a wire could even be fitted in the bead of adhesive 8 or between the two beads. At least one end of wire 11 is left free so that, after mounting, it can be grasped by an operator, possibly using a tool. A tensile force may permit either the bead of adhesive 8 or the profiled bead 6, as in the case of FIG. 2, to be cut.

Figure 3:
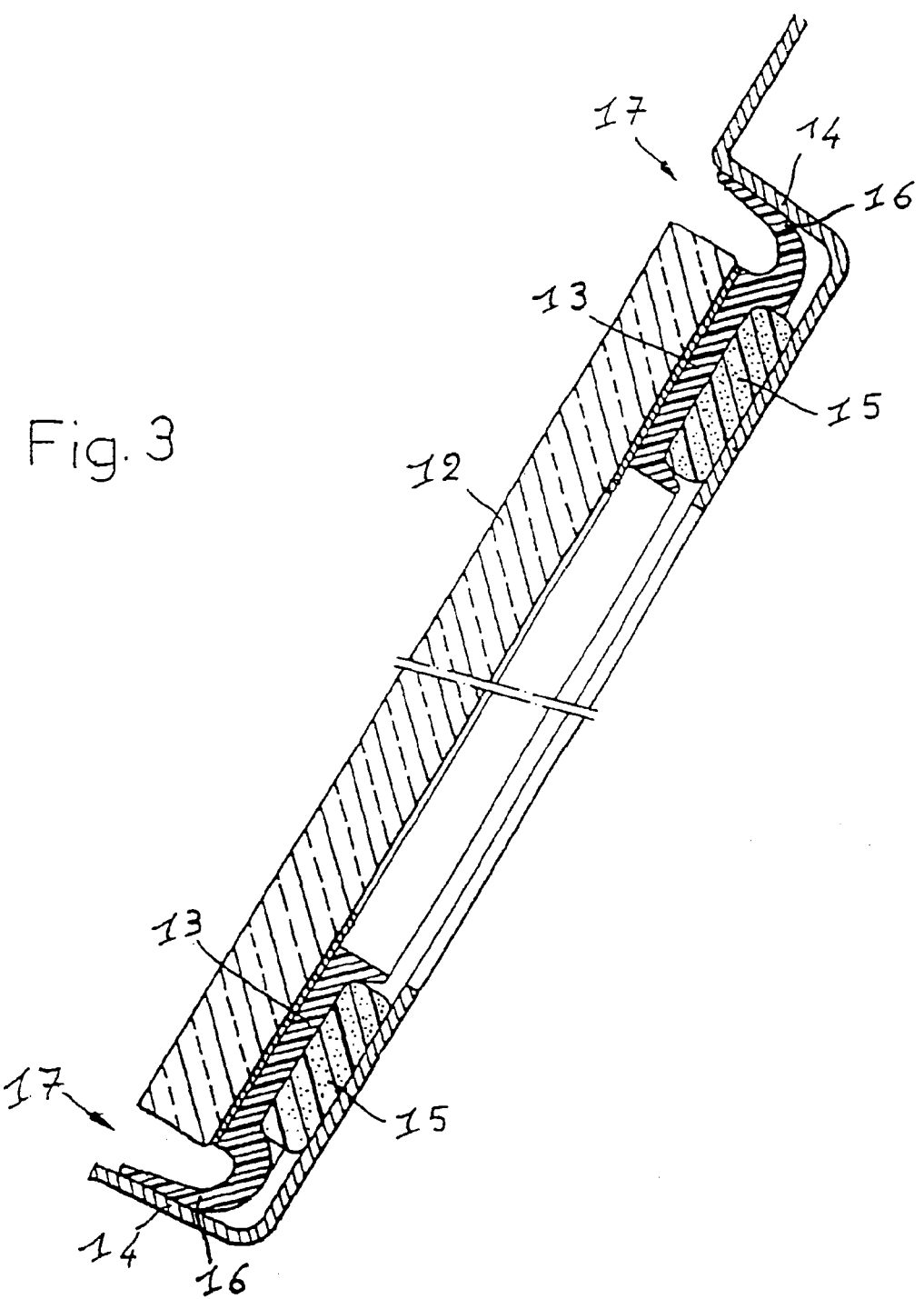
FIG. 3 shows a cross-sectional side view of an embodiment of the invention using another window glass.

FIG. 3 schematically illustrates an embodiment according to the invention for mounting of a window glass 12 comprising a profiled bead 13 in a bodywork opening 14, using a bead of adhesive 15. Also shown in addition to a window glass 12 and a profiled bead 13 is the edge of an opening 14 in bodywork which is not further illustrated. Window glass 12 is connected by adhesion to the bodywork upright 14 by means of a bead of adhesive 15 applied to the profiled bead 13. Lips 16 also are shown extending profiled bead 13 so as to project beyond the edge of the window glass 12 in their deformed state. FIG. 3 also clearly shows the various functions of said lip, particularly the centering, sealing and water run-off functions.

In the mounted state, the external main surface of window glass 12 is practically flush with the external surface of the bodywork. Furthermore, according to the invention, the space 17 visible between the bodywork opening and the window glass has a size less than 5 millimeters.

By comparison with the earlier configurations for the mounting of such window glasses the present invention provides a space between the window glass and the bodywork opening making it possible to avoid the build-up of dirt. Furthermore, it has been found that a reduction in said space also makes it possible to reduce aerodynamic noise. Another advantage of the present invention is that it affords a very particular visual and attractive appearance, because, to an observer standing a relatively short distance away from a vehicle with this set-up, the window glass appears to be an uninterrupted continuation of the bodywork.

The detailed description which has just been given relates more particularly to a window glass equipped by extrusion with a profiled bead which adheres to a main surface.

The same teachings apply to profiles obtained by other techniques (encapsulation or adhesive bonding) and/or covering more than one face of the window.

What is claimed is:

1. A windshield, comprising:
   a sheet of glass having two main surfaces, each surface having a top edge, two side edges and a bottom edge;
   at least one profiled bead fixed to at least one edge of at least one main surface of the sheet of glass;
   wherein:
   the profiled bead comprises, over at least a portion of its length, an elastically deformable lip that projects beyond the at least one edge of the glass sheet;
   when the windshield is installed in an opening framed by bodywork of a vehicle, the at least one profiled bead faces toward an interior of the bodywork and contacts the interior of the bodywork; and
   when the windshield is installed in the opening, the lip contacts the interior of the bodywork and deforms to provide a space of less than 5 mm between the at least one edge of the glass sheet and the interior of the bodywork.

2. The windshield of claim 1, wherein the profiled bead comprises a bead of adhesive.

3. The windshield of claim 2, wherein the profiled bead comprises at least one rib that limits lateral expansion of the bead of adhesive.

4. The windshield of claim 2, further comprising at least one wire incorporated into the bead of adhesive or the profiled bead.

5. The windshield of claim 4, wherein the at least one wire comprises at least two cutting wires.

6. The windshield of claim 2, wherein:
   the profiled bead and the bead of adhesive are formed by co-extrusion directly onto the at least one main surface of the sheet of glass; and
   at least the bead of adhesive remains plastically deformable and adhesive until the window glass is installed in the opening.

7. The windshield of claim 1, wherein the profiled bead comprises a two-part material.

8. The windshield of claim 1, wherein the profiled bead comprises a thermoplastic material.

9. The windshield of claim 1, wherein the profiled bead is formed by extrusion directly onto the at least one main surface of the sheet of glass.

10. The windshield of claim 1, wherein the profiled bead is manufactured before the profiled bead is fixed to the sheet of glass.

11. The windshield of claim 1, wherein the profiled bead is produced by an encapsulation technique.

12. The windshield of claim 1, wherein the lip is provided at and extends beyond the top edge of the sheet of glass.

13. The windshield of claim 12, wherein the lip is provided at and extends beyond at least one of the side edges of the sheet of glass.

14. The windshield of claim 12, wherein the lip is provided at and extends beyond both side edges of the sheet of glass.

15. The windshield of claim 1, wherein the lip is provided at and extends beyond at least one side edge of the sheet of glass.

16. The windshield of claim 15, wherein the lip is provided at and extends beyond both side edges of the sheet of glass.

17. The windshield of claim 15, wherein the lip is provided at and extends beyond the top edge of the sheet of glass.

18. The windshield of claim 1, wherein the lip is provided at and extends beyond only the top edge and the side edges of the sheet of glass.

19. The windshield of claim 1, wherein the lip is provided at and extends beyond only the top edge of the sheet of glass.

20. The windshield of claim 1, wherein, when the windshield is installed in the opening, the lip contacts the interior of the bodywork and deforms to provide a space of less than 5 mm between at least one edge of an interior surface of the glass sheet and the interior of the bodywork.

* * * * *

UNITED STATES PATENT AND TRADEMARK OFFICE
CERTIFICATE OF CORRECTION

PATENT NO. : 7,905,071 B2  Page 1 of 1
APPLICATION NO. : 11/373114
DATED : March 15, 2011
INVENTOR(S) : Jean-Gerard Leconte It is certified that error appears in the above-identified patent and that said Letters Patent is hereby corrected as shown below:

On the title page, Item (75) should read:

--(75) Inventor: Jean-Gerard Leconte, Courbevoie (FR)--

Column 2, line 51, "fro" should read --from--

Column 4, line 65, "According one embodiment," should read --According to one embodiment,--

Signed and Sealed this
First Day of May, 2012

David J. Kappos
*Director of the United States Patent and Trademark Office*